(12) United States Patent
Vasilantone

(10) Patent No.: US 8,072,182 B2
(45) Date of Patent: Dec. 6, 2011

(54) HYBRID AUTOMOTIVE VEHICLE WITH CLOSED-CIRCUIT, INDUCTANCE BATTERY CHARGING

(76) Inventor: Michael M. Vasilantone, Bayonne, NJ (US)

( * ) Notice: Subject to any disclaimer, the term of this patent is extended or adjusted under 35 U.S.C. 154(b) by 431 days.

(21) Appl. No.: 12/011,145

(22) Filed: Jan. 25, 2008

(65) Prior Publication Data

US 2009/0189564 A1 Jul. 30, 2009

(51) Int. Cl.
*H02J 7/14* (2006.01)

(52) U.S. Cl. ........................................ 320/104; 320/109

(58) Field of Classification Search .................. 320/104, 320/109
See application file for complete search history.

(56) References Cited

U.S. PATENT DOCUMENTS

| | | | | |
|---|---|---|---|---|
| 5,646,500 | A * | 7/1997 | Wilson | 320/108 |
| 5,669,470 | A * | 9/1997 | Ross | 191/10 |
| 5,710,502 | A * | 1/1998 | Poumey | 320/108 |
| 5,850,135 | A * | 12/1998 | Kuki et al. | 320/108 |
| 2005/0088139 | A1* | 4/2005 | Frank | 320/104 |
| 2007/0131505 | A1* | 6/2007 | Kim | 191/14 |
| 2009/0278492 | A1* | 11/2009 | Shimizu et al. | 320/108 |

* cited by examiner

*Primary Examiner* — Arun Williams
(74) *Attorney, Agent, or Firm* — Charles I. Brodsky

(57) ABSTRACT

An underground source of electrical energy is inductively coupled to a receiver on a hybrid automotive vehicle to provide charging power for the vehicle's battery.

4 Claims, 5 Drawing Sheets

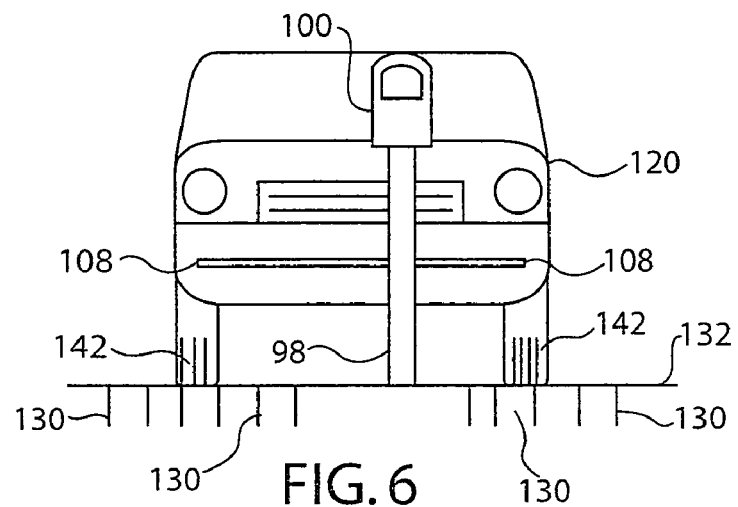
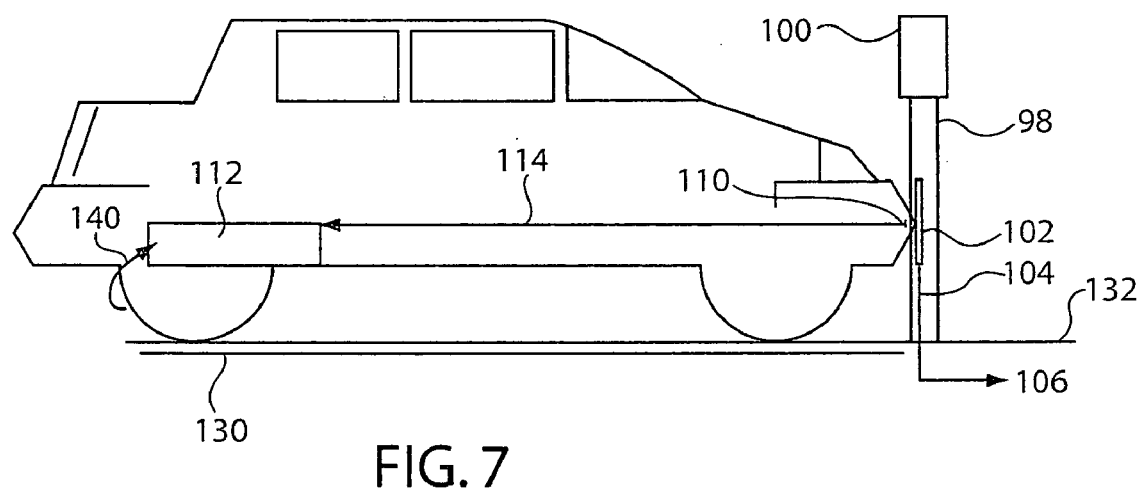

HYBRID AUTOMOTIVE VEHICLE WITH CLOSED-CIRCUIT, INDUCTANCE BATTERY CHARGING

CROSS-REFERENCE TO RELATED APPLICATIONS

None

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not Applicable

BACKGROUND OF THE INVENTION

1. Field of the Invention

This invention relates to hybrid automotive vehicles combining electric motors and generators with combustion engines, in general, and to a hybrid automotive vehicle in which closed-circuit battery charging is automatically achievable without operator involvement in parking, in particular.

2. Description of the Related Art

As is well known and understood, automotive manufacturers are either producing or developing automobiles with hybrid engines which combine electrical power with internal combustion engines. In these designs, the generator constantly charges the vehicle's batteries, while increasing revolutions during moments of deceleration increases the charging of the batteries and the braking forces applied to the drive shaft. There, the electric motor always assists the engine during vehicle acceleration, but at the same time always senses the drive shaft load in reacting on demand; in these configurations, the electric motor also acts as a primary driver in preventing battery over-charge.

SUMMARY OF THE INVENTION

As will become clear from the following description, the present invention may operate in a system which combines an electric motor and generator with a rotary combustion engine. As will be understood, the engine may utilize a rotary internal combustion engine which incorporates features of my prior U.S. Pat. No. 3,971,347 (issued Jul. 27, 1976), U.S. Pat. No. 4,307,695 (issued Dec. 29, 1981), U.S. Pat. No. 6,698,395 (issued Mar. 2, 2004) and U.S. Pat. No. 7,191,855 (issued Mar. 20, 2007—and of my pending U.S. patent application Ser. No. 11/598,285, filed Nov. 13, 2006 (Publication No. US-2008-0111519, published May 15, 2008), now abandoned.

a) My patent, U.S. Pat. No. 3,971,347 describes a rotary internal combustion engine housing and a concentrically arranged chamber within the housing in receiving an eccentrically disposed cylindrical rotor; the rotor cooperates with the chamber to define a crescent-shaped chamber which is sequentially divided into intake, compression, combustion and exhaust chambers by means of vanes which are pivotally mounted on the annular surface of the rotor and which engage the inner surface of the housing in defining the chamber. The resulting configuration provides efficiency of operation, effective sealing between the rotor and the housing, effective minimalization of heat build up due to frictional contact, and a great rigidity and strength.

b) My second patent, U.S. Pat. No. 4,307,695 provides enhanced operation by having a blower and/or superchargers that are driven by the rotary engine. The design includes a rotor, a plurality of pistons angularly mounted in the rotor, an actuator mounted for eccentric rotation relative to the access of rotation of the rotor, a blower, a transverse actuator pin connecting each piston to the actuator, and a plurality of fixed pins connecting the rotor to the actuator. With the fixed pins mounted on the rotor so as to pass through clearance holes in the blower in carrying extension gears which mate with internal gears mounted in the actuator, rotation of the rotor causes rotation of the blower and of the actuator as well. As there set forth, the rotational force that results changes the pressure line in its direction, moving it towards the direction of rotation as the rotational speed increases.

c) My third patent, U.S. Pat. No. 6,698,395 describes a hybrid engine that includes the basic configuration of my U.S. Pat. No. 4,307,695 patent—but, instead of employing its pistons, utilizes the pivoting vane concept of my U.S. Pat. No. 3,971,347 patent albeit somewhat modified. Also, in so doing, the blower and supercharger of my later design is eliminated—leading to the end result of a very small engine yet with a comparable amount of power as with hybrid engines utilizing standard cylinder engines. This hybrid engine includes an electric generator, an electric motor, and a rotary internal combustion engine that includes pivoted vane elements mounted on a rotor and biased into engagement to sequentially form intake, compression, combustion and exhaust chambers between the rotor and its annular wall.

d) My fourth U.S. Pat. No. 7,191,855 describes the hybrid portion of the rotary engine being modified to include a translator element connected to an electric clutch-brake within the generator component, an operator vertical control lever, and a central programmable control module. Such modifications allow for the elimination and replacement of the steering wheel and foot pedals of the conventional vehicle, an increased charging by the generator, and an increased braking of the drive shaft when necessary. The end result will be an increase in fuel efficiency and an increase in operator efficiency. At the same time the arrangement allows a rotary engine which employs no transmission whatsoever, within a power module containing three major components: an engine, an electric motor, and a generator system all mounted on one common drive shaft.

e) My pending application Ser. No. 11/598,285 describes an invention not only applicable to these hybrid rotary internal combustion engines but to all hybrid engines in which battery employment is utilized in the operation of the vehicle. In a first version of the described invention, closed circuit battery charging is utilized automatically upon parking the vehicle without individual operator involvement. In a second version of the invention, solar battery charging during daylight hours is automatically provided by means of electrical generating solar elements provided in the vehicle's paint finish More specifically, the first version of the Ser. No. 11/598,285 invention embodies teachings similar to those employed in closed-circuit aircraft refueling employing probe-and-drogue methods. There, an aircraft that needs to refuel extends a device (probe) that is inserted into the center of a cone-shaped basket component known (drogue) at the end of a long flexible hose which is unreeled from behind and below the tanker aircraft. In accordance with that invention, a male coupler at an outside location of the vehicle joins with a female coupler at a nesting site where the vehicle parks, and is there connected to an underground source of charging power for the vehicle's battery. In this manner, whenever the vehicle is to be parked in a garage or in a parking lot, automatic recharging of the battery occurs. Whether parking in one's own garage, or at a school, or at a supermarket parking lot, or at some other parking space, the closed-circuit which results automatically starts the re-charging of the hybrid vehicle's battery. (As will also be appreciated, the locations of the male and female couplers could be reversed, however.)

In the second version of the Ser. No. 11/598,285 invention, semiconductor bits, ultraviolet-light photons or nanocrystals are formulated with a polythiophene conductive polymer in a paint resin for the outer surface of the vehicle to gather energy as a large solar collector. Analysis has shown this to be far more effective than just mounting solar cells at various locations on the vehicle's bodywork.

As will become clear from the following description, a first version of the present invention employs inductance coupling between the motor vehicle and the source of charging power for the vehicle's battery through—for example, an insulated plastic coating on its bumper to a receiver enclosing the electrical wiring in the coating along the full length of the bumper. In this version of the invention, the sending source of charging power could simply be a vertical post which is also insulated.

In a second version of the present invention, the automatic coupling for charging the vehicle's battery follows the use of manufacturing the vehicle's tires with an electrically conductive formulation in its treads so as to be capable of receiving a charge while the vehicle is parked on a specially prepared surface coupled to the charging source for the battery, or while the vehicle is in motion along a specially prepared roadway surface designed for such purpose.

In either embodiment of the present invention, when the vehicle has an electrically charging receiving wire embedded along the length of the front bumper just below the skin, or just below the contact surface of the tire's treads, the mechanical apparatus and line-up requirements shown in the first version of my Ser. No. 11/598,295 Application could be eliminated—thereby extending the ability to charge the vehicle's battery while reducing the possibility of physical damage through contact, as well as reducing any possibility of the system's being shorted out, or of producing an electrical spark between the two contact surfaces.

As will be understood, whether the teachings of the present invention are employed with the hybrid engines of my previous described designs, or with those of others, the net result will continue to be a significant reduction in the use of gasoline in vehicular transportation.

BRIEF DESCRIPTION OF THE DRAWINGS

These and other features of the present invention will be more clearly understood from a consideration of the following description, taken in connection with the accompanying drawings in which:

FIGS. 6 and 7 is a pictorial illustration helpful in an understanding of the second embodiment of the invention as relates to the electrical inductance coupling through the vehicle's tires.

DETAILED DESCRIPTION OF THE INVENTION

As an alternative to simply providing a supply cord from an electric outlet in charging the storage batteries of hybrid automotive vehicles overnight, the invention of my Ser. No. 11/598,285 Application provides a continuous trickle charge if and as needed automatically once the vehicle is parked. As will be appreciated, the closed-circuit battery charging system of that invention can be installed in almost any facility—such as at a parking spot in a supermarket, mall or motel parking lot, on a street adjacent parking meters, or at any private garage parking (whether at home or away).

Figure 1:
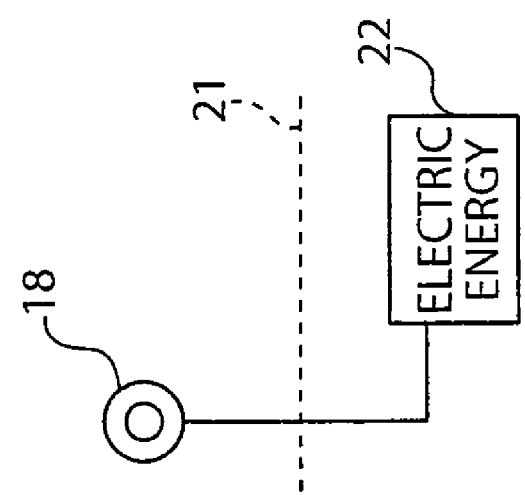
FIG. 1 is a pictorial illustration of a preferred location for the male coupler of the closed-circuit battery charging version of my Ser. No. 11/598,285 invention.
Figure 1:
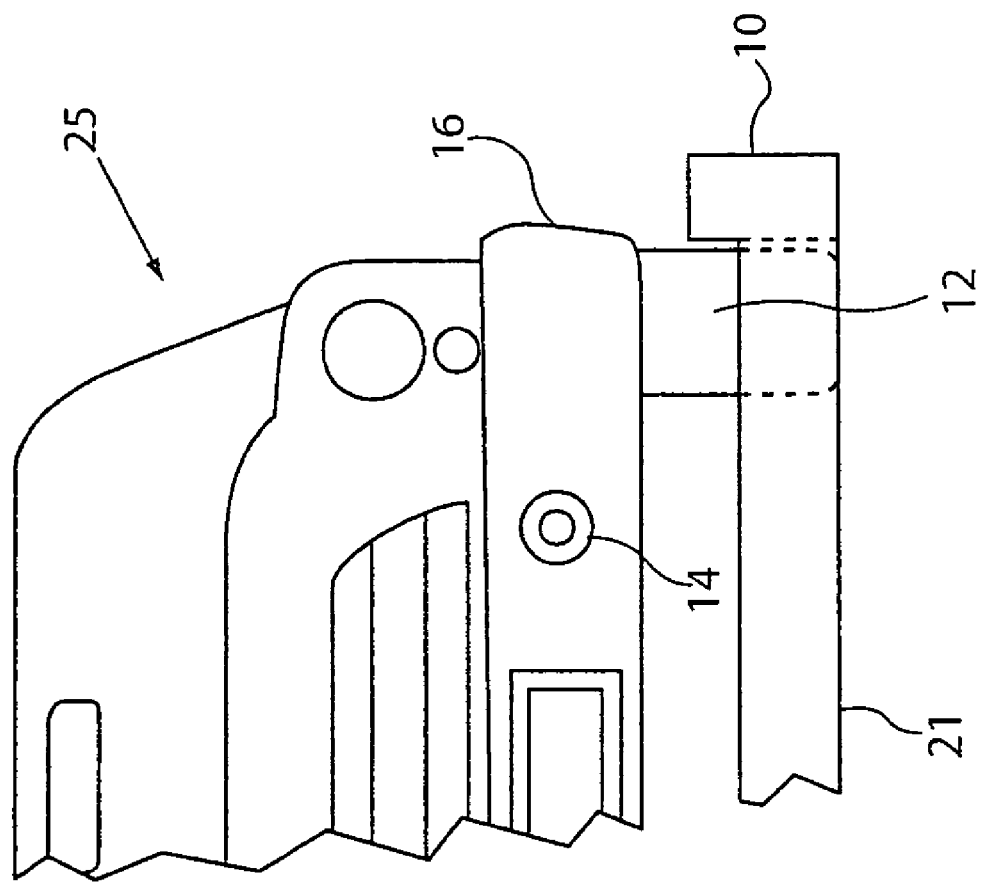

FIG. 1, according to that invention, shows a partial front view of a hybrid automotive vehicle 25 along with a tire nest 10 for its driver's side front wheel 12. A male coupler 14 is included on the front bumper 16 to align with a female coupler 18 when so nested, with the female coupler 18 then being connected to a source of electrical energy under ground 21, as at 22. In accordance with the Ser. No. 11/598,285 invention, aligning the wheel 12 with the nest 10 then mates the two couplers together so that the underground electrical power can charge the storage batteries of the hybrid vehicle. As will be appreciated, such vehicle is of a type including a gasoline engine, an energy storage fuel tank device for the engine, an electric motor, energy storage device batteries for the motor, and a generator—all interacting to draw energy from the batteries when the vehicle is accelerated, and returning energy to the batteries when the vehicle is slowed, in known manner.

Figure 2:
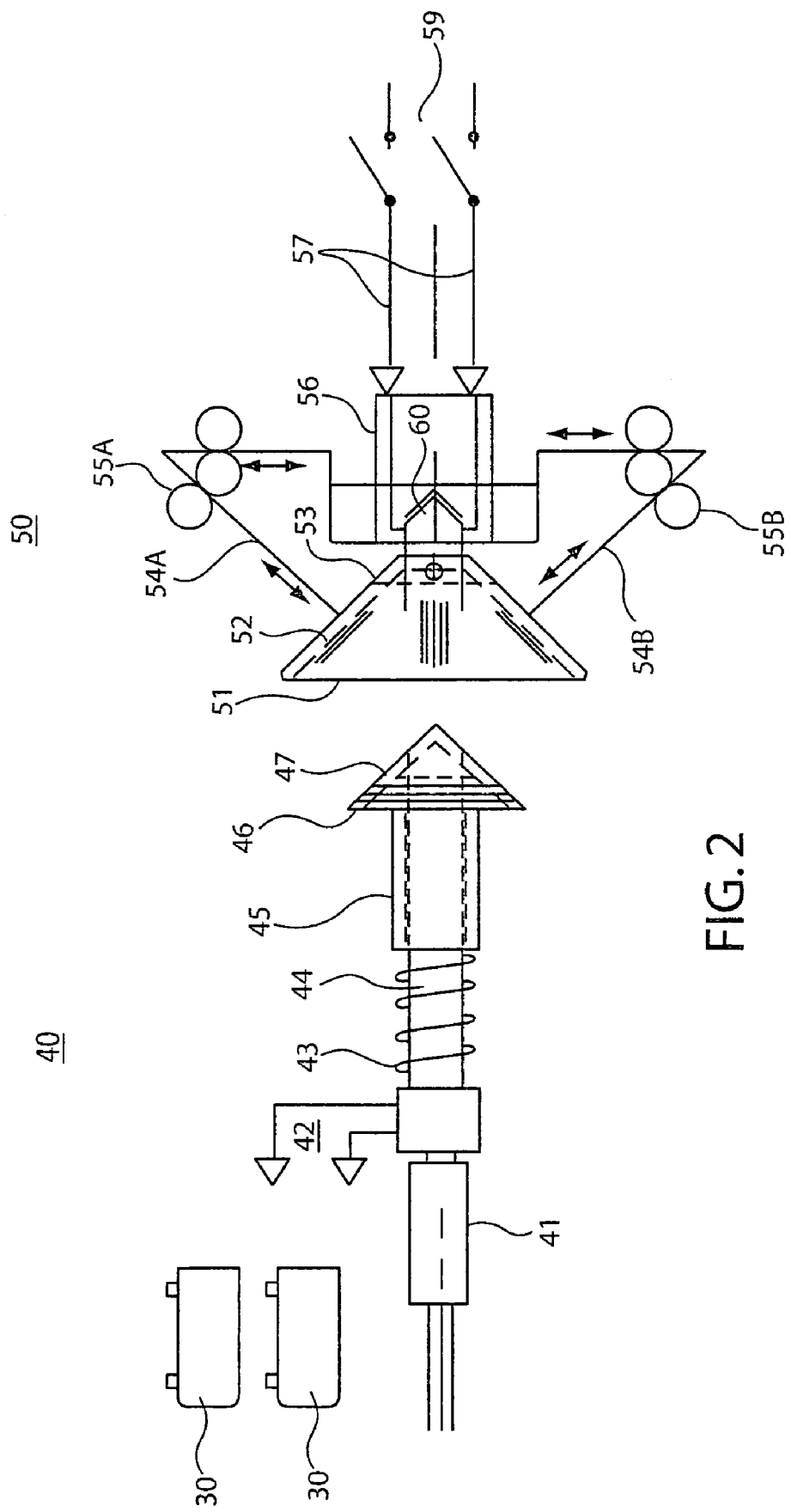
FIG. 2 is a schematic diagram helpful in an understanding of the manner by which the coupler of FIG. 1 initiates a feed from an underground electrical power source to the storage batteries of the vehicle.

The storage batteries for the hybrid vehicle is shown at 30 in FIG. 2, the male coupler on the vehicle is shown at 40, and the female coupler is shown at 50. In particular, the male coupler 40 includes a solenoid 41, a set of connections 42 for the batteries 30, a compression spring 43 and an electrical plug 44. A tubular guide 45 aligns the plug 44 with a bumper cap 46 together with an external concentric sensor 47. As will be appreciated, the components 41-47 essentially comprise, and are represented by, the male coupler 14 of FIG. 1.

Following through on the probe-and-drogue method of aircraft refueling, the female coupler 50 of FIG. 2 incorporates a dish 51 having a set of internal sensors 52 to recognize the insertion of the concentric sensor 47 of the male coupler 40. A universal 53 mounts with the dish 51 (which is preferably spring-loaded) to tilt the dish 51 in automatically centering the sensor 47 once physical contact is made. A further, included track tilt 54 (A and B) and track drive 55 (A & B) provides the central alignment in well known manner to ensure the seating of the concentric sensor 47 with the dish 51.

Once the alignment is achieved, the male plug 44 seats into a receptacle 56 (as illustrated at 60) and the source connection 57 automatically energizes the solenoid 41 from the underground electrical energy source 59. The recharge of the batteries 30 then automatically follows.

Figure 3:
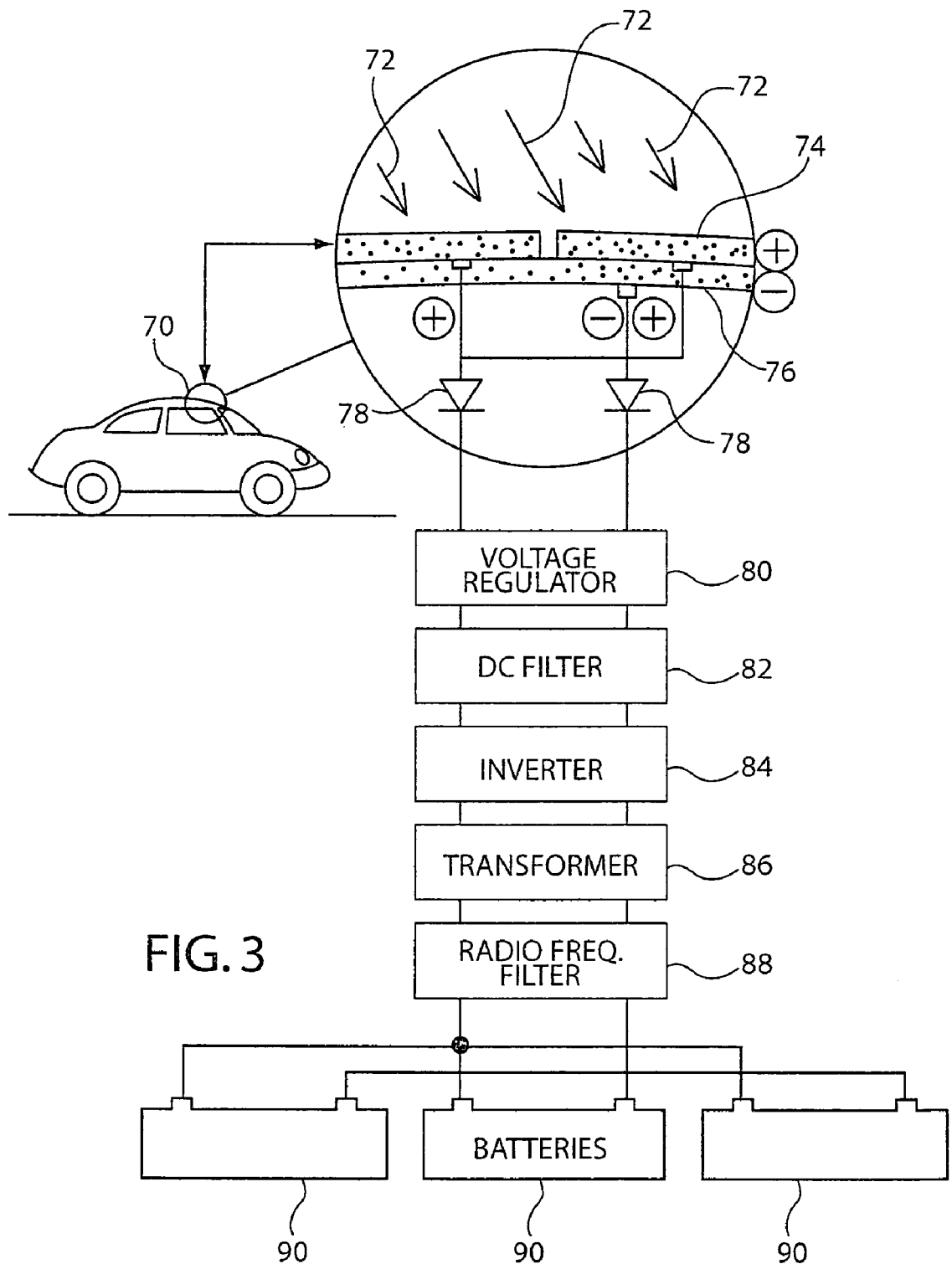
FIG. 3 is a depiction helpful in understanding how a painted outside surface of the vehicle is able to provide efficient electrical solar energy to its included storage batteries in accordance with my Ser. No. 11/598,295 Application.

As will be appreciated by those skilled in the art, the solar battery charging arrangement of the Ser. No. 11/598,285 invention shown in FIG. 3 can operate with the closed-circuit battery charging of FIGS. 1 and 2, or separate from it. With solar energy being substantially free, clean and inexhaustible, solar battery charging can occur according to the invention when the automotive vehicle includes an outer paint resin finish which includes individual ones of semi-conductive bits, ultra-violet photons or nanocrystals in a polythiophene conductive polymer. One composition for this includes the conductive, photosensitive polymer MEH-PPY with lead selenide quantum dots. In particular, under visible light, a finish incorporating these dots at only 5 percent by weight generates 50 percent more current than expected, and with an 8-nanometer-diameter lead selenide crystal provides quite acceptable results. Incorporated as a paint resin to form the outer painted surfaces of the vehicle, a surface of the type described gathers energy as a large solar collector and a channelable converter directly to the vehicle's batteries. In FIG. 3, the spray painted surface 70 is shown at the roof of the vehicle, in which the light photons 72 strike the P-type layers 74, in which the underlying N-type layers 76 couple through a pair of blocking diodes 78 through a voltage regulator 80, a DC filter 82, an inverter 84, a transformer 86, and a radio frequency filter 88 to the various batteries 90 as may be utilized in the hybrid vehicle.

Analysis has shown that with either version of the Ser. No. 11/598,285 invention described above, the reduction of fuel to electricity ratio to power the vehicle can be established at some 25 percent, rather than at close to 100 percent with present modern day vehicles.

Figure 4:
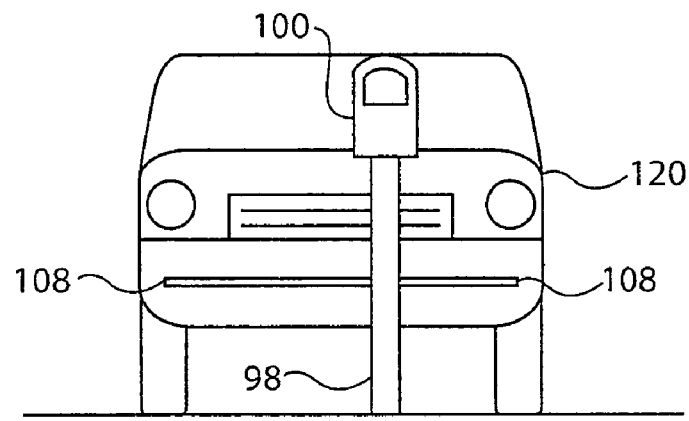
FIGS. 4 and 5 are pictorial illustrations of the electrical inductance coupling for charging the vehicle's battery in accordance with the first embodiment of the present invention.
Figure 5:
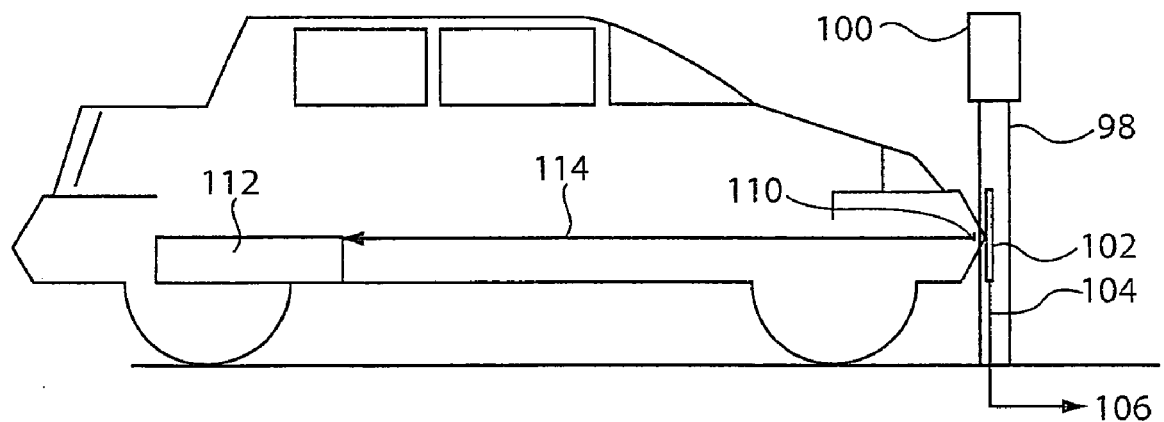

FIGS. 4 and 5 illustrate the principles of the present invention operative with a vertical post 98, such as that which supports a parking meter 100. An output pod 102 embedded adjacent an external surface of the post 98 is electrically connected in any appropriate manner 104 to the source of electrical energy located under the ground, as at 106. Embedded in the front of the vehicle, as within its front bumper 108, is an input receiver 110 connected to the vehicle's storage batteries to be charged 112—as along an electrical connection 114. By appropriately positioning the output pod 102 with respect to the receiver 110, inductance coupling would result to transfer the electrical energy from the source 106 to the receiver 110, and from there along the connection 114 to the batteries 112. To insure that the inductance coupling will occur independent of the exact placement of the vehicle 120 with respect to the post 98, the embedded input receiver 110 is designed to run along a length of its front bumper—preferably, along substantially the entire length of the front bumper 108, just below its skin. Even when there is physical contact between the bumper 108 and the post 98, the inductance coupling continues to provide the electrical charging while the embedding of the receiver within an insulated coating below the outer skin of the bumper and along its length protects the receiver from damage that might result from such impact. The electrical connection 104 in this regard is located within an insulated enclosure below an external surface of the vertical post 98.

The pictorial illustrations of FIGS. 6 and 7—although similar in many respects to that shown in FIGS. 4-5—are helpful in demonstrating that the electrical coupling from the charging energy source 106 can extend in special tracks 130 running under the ground 132. To provide the inductive coupling to the batteries 112, the electrical receiver would run within tires of the vehicle, and to then couple by the connection 140 to the batteries 112. In this version, then, as the vehicle is parked on the roadway, or when it is moving on the roadway where the electrical embedding is located, the batteries continue to be charged in manner similar to that of FIGS. 4-5. Preferably, the electrical receiver in this respect is in the form of electrical wires 142 embedded in at least the treads of the front tires 144 of the vehicle.

While there have been described what are considered to be preferred embodiments of the present invention, it will be readily understood that modifications can be made without departing from the scope of the teachings herein. For at least such reason, therefore, resort should be had to the claims appended hereto for a true understanding of the invention.

I claim:

1. A closed-circuit battery charging system comprising:
a hybrid automotive vehicle having a gasoline engine, an energy storage device fuel tank for the engine, an electric motor, energy storage batteries for the motor, and a generator, all interacting for the electric motor to draw energy from the batteries when accelerating the vehicle, and to return energy to the batteries when slowing the vehicle;
a below-ground supply of electrical energy;
an insulated vertical post extending above-ground and coupled with said below-ground electrical energy supply to provide a source of transmitted electrical power for charging said energy storage batteries;
a receiver of transmitted electrical power within an insulated coating on the front bumper of the vehicle positioned to inductively couple with said source;
and means within the vehicle coupled between the receiver on the vehicle and the batteries thereof to automatically begin charging the batteries when the vehicle is parked with the front bumper in physical contact with the insulated vertical post for electrical inductance coupling to occur between the source of electrical power and the receiver;
wherein the source of electrical power is embedded within the vertical post along an external surface thereof, and wherein the receiver is embedded within the insulated coating extending sideways, from side-to-side thereof, horizontally and substantially along the entire length of the front bumper of the automotive vehicle.

2. The closed-circuit battery charging system of claim 1 wherein the insulated coating extends just below the outer skin of the front bumper substantially along the entire length of the bumper.

3. A closed-circuit battery charging system comprising:
a hybrid automotive vehicle having a gasoline engine, an energy storage device fuel tank for the engine, an electric motor, energy storage batteries for the motor, and a generator, all interacting for the electric motor to draw energy from the batteries when accelerating the vehicle, and to return energy to the batteries when slowing the vehicle;
a below-ground supply of electrical energy;
an insulated vertical post extending above-ground and coupled with said below-ground electrical energy supply to provide a source of transmitted electrical power at an output pod embedded adjacent an external surface of said post for charging said energy storage batteries;
a receiver of transmitted electrical power within an insulated plastic coating on the front bumper of the vehicle positioned to inductively couple with said output pod;
and means within the vehicle coupled between the receiver and energy storage batteries to automatically begin charging the batteries when the vehicle is parked with the front bumper in physical contact with the insulated vertical post for electrical inductance coupling to occur between said output pod and said receiver;
and wherein the receiver is embedded within the insulated coating extending sideways, from side-to-side thereof, horizontally and substantially along the entire length of the front bumper of the automotive vehicle.

4. The closed-circuit battery charging system of claim 3 wherein the insulated plastic coating extends just below the outer skin of the front bumper substantially along the entire length of the bumper.

* * * * *